(12) United States Patent
Cadix

(10) Patent No.: US 10,144,857 B2
(45) Date of Patent: Dec. 4, 2018

(54) USE OF ENCAPSULATED POLYAMINES FOR LIMITING FLUID LOSS

(71) Applicant: RHODIA OPERATIONS, Paris (FR)

(72) Inventor: Arnaud Cadix, Saint-Ouen (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/511,804

(22) PCT Filed: Sep. 25, 2015

(86) PCT No.: PCT/EP2015/072162
§ 371 (c)(1),
(2) Date: Mar. 16, 2017

(87) PCT Pub. No.: WO2016/046393
PCT Pub. Date: Mar. 31, 2016

(65) Prior Publication Data
US 2017/0306208 A1    Oct. 26, 2017

(30) Foreign Application Priority Data

Sep. 26, 2014   (EP) .................................... 14290292

(51) Int. Cl.
| | | |
|---|---|---|
| *E21B 33/138* | (2006.01) | |
| *C09K 8/035* | (2006.01) | |
| *C09K 8/512* | (2006.01) | |
| *C09K 8/516* | (2006.01) | |
| *C09K 8/68* | (2006.01) | |
| *C09K 8/70* | (2006.01) | |
| *C09K 8/88* | (2006.01) | |
| *C09K 8/92* | (2006.01) | |
| *C09K 8/44* | (2006.01) | |
| *E21B 21/00* | (2006.01) | |
| *E21B 43/26* | (2006.01) | |

(52) U.S. Cl.
CPC ................ *C09K 8/035* (2013.01); *C09K 8/44* (2013.01); *C09K 8/512* (2013.01); *C09K 8/516* (2013.01); *C09K 8/68* (2013.01); *C09K 8/685* (2013.01); *C09K 8/70* (2013.01); *C09K 8/887* (2013.01); *C09K 8/92* (2013.01); *E21B 21/003* (2013.01); *E21B 33/138* (2013.01); *E21B 43/26* (2013.01)

(58) Field of Classification Search
CPC ........ C09K 8/035; C09K 8/512; C09K 8/516; C09K 8/685; C09K 8/70; C09K 8/887; C09K 8/92; E21B 21/003; E21B 33/138; E21B 43/26
See application file for complete search history.

(56) References Cited

U.S. PATENT DOCUMENTS

| | | |
|---|---|---|
| 5,981,446 A | 11/1999 | Qiu et al. |
| 6,209,646 B1 | 4/2001 | Fu et al. |
| 2003/0236171 A1 | 12/2003 | Nguyen et al. |
| 2008/0223578 A1 | 9/2008 | Berkland et al. |
| 2010/0132948 A1 | 6/2010 | Fu et al. |
| 2011/0114318 A1 | 5/2011 | Ezell et al. |
| 2011/0237465 A1 | 9/2011 | Lee et al. |
| 2013/0056199 A1 | 3/2013 | Reddy et al. |
| 2014/0100304 A1 | 4/2014 | Cadix et al. |

FOREIGN PATENT DOCUMENTS

WO    WO 2012/123319 A1    9/2012

OTHER PUBLICATIONS

Maurstad Gjertrud et al., "Metastable and stable states of xanthan polyelectrolyte complexes studied by atomic force microscopy", BIOPOLYMERS, vol. 74, No. 3, Jan. 1, 2004.
Moradi-Araghi Ahmad, "A review of thermally stable gels for fluid diversion in petroleum production" Journal of Petroleum Science and Engineering, vol. 26, No. 1, Jan. 1, 2000.
U.S. Appl. No. 15/511,501, Arnaud Cadix, filed Mar. 16, 2017.

*Primary Examiner* — Zakiya W Bates

(57) ABSTRACT

A method for sealing a subterranean environment, wherein a polyurethane encapsulated polyamine is injected into the subterranean environment and is released in situ in the presence of a reactive species able to form a gel or a precipitate by a physical association and/or a chemical reaction with the released polyamine, is described herein.

12 Claims, No Drawings

USE OF ENCAPSULATED POLYAMINES FOR LIMITING FLUID LOSS

This application is a U.S. national phase entry under 35 U.S.C. § 371 of International Application No. PCT/EP2015/072162, filed on Sep. 25, 2015, which claims priority to European Application No. 14290292.3, filed on Sep. 26, 2014. The entire contents of these applications are incorporated herein by this reference.

The instant invention relates to formulations allowing a controlled release of hydrophilic components downhole during an oil or gas exploration or production operation, e.g. during drilling, completion or hydraulic fracturing processes. The invention especially relates to formulations suitable for releasing an hydrophilic active ingredient contained therein at downhole location where a ultra high shear is applied, for example specifically at drill bit during drilling operations, e.g. for avoiding loss of servicing fluid during these operations.

One of the most severe case of fluid loss during an oil and gas exploration and production operation is lost circulation during drilling. Lost circulation is a well-known, costly and time-consuming problem, that tends to occur when overpressure applied by drilling mud hydrostatic pressure create fractures in surrounding rocks or if drill bit encounters natural fractures or voids. Drilling mud may then be lost in formation, which may imply that formation pressure cannot be balanced, with poor or no removal of drill cuttings. Depending on the severity, a lost circulation situation induces more or less risks of damaging/losing the well and/or the drilling tools.

Damaging fluid loss situations may also be observed in other operations, for instance during hydraulic fracturing when fluid is pumped at high velocity with a large overpressure in order to create fractures within the formation. In such situations, it is also desirable to avoid fluid penetration within the formation, at least for economic and/or environmental reasons. It also limits formation damage.

In order to inhibit losses or at least to reduce them at least to an acceptable level, it has been proposed to inject a delayed gelling system with the aim to form a gel at the location where the losses occur. Different kinds of delayed gelling system able to form a gel downhole have been described in this connection, intended to prevent further losses and resume circulation. In most of the current available systems, however, it is most difficult to control location of actual gelling of these delayed system and therefore difficult to be sure that the obtained gelification is actually efficient for limiting fluid losses.

As an example, delayed gelling systems have been described that are based on a delayed chemical reaction versus temperature (transamidification of polyacrylamide with a polyethyleneimine triggered by the temperature for example) that is supposed to allow the system to set in appropriate location. Such systems, that have been especially described in U.S. Pat. No. 6,607,035, US 2005/0230113 or US 2012/0132422, lack of precision on the gelation location, which limits their use in practice to water shutoff applications only.

Other delayed gelling systems described in the past rely on downhole mixtures of reactive components initially separated and to be contacted in situ only. These systems need specific delivery tool to ensure that no premature mixing is occurring during the pumping downhole. As an example, reference may be made to US 2005/0199390. It is then difficult to ensure that sufficient mixing is performed once at target location. This implementation is highly time consuming an, in most cases, does not even provide a good insurance of mixing the products at the appropriate location.

An interesting alternative has been described in WO 2012/123319 that relates to an amine polymerization accelerator encapsulated in a polyurethane shell, that is released when triggered by physical means (high shear, high pressure, temperature, crushing, shearing or any combination of the above, for example the conditions at drill bit during drilling operations). More precisely, WO 2012/123319 describes a process for the encapsulation comprising the steps of:

(a) providing a reverse emulsion containing, in an oil phase, a water solution or dispersion (W1) containing the polymerisation activator to be encapsulated, the oil phase including a heat curable mixture of an isocyanate and a polyalkyldiene hydroxylated or polyol;

(b) pouring said reverse emulsion in a water phase (W2) to make a multiple emulsion water/oil/water, containing drops including the activator as the internal water phase; and (c) heating the obtained multiple emulsion, whereby the polyisocyanate is cured into polyurethane, which leads to drops of activator (W1) enclosed in shells of polyurethane dispersed in water (W2).

WO 2012/123319 describes the use of the encapsulated polymerization accelerator as obtained in step (c) for triggering a quick gelation by polymerisation downhole: the encapsulated accelerator is used in admixture with a polymerisable mixture including (i) water soluble or hydrodispersable acrylated or methacrylated polyoxyethylene and/or polyoxypropylene monomers and (ii) a polymerization initiator (a redox initiator typically) and the polymerisation occurs in situ when the accelerator enters in contact with the initiator and not prior the release of the accelerator. This targeted gelation by control release of the polymerisation accelerator is very interesting but also very specific and implies a complex system, that may be delicate to implement in practice, and especially needs to be used in conditions where the initiator remains stable (compatibility with other components, radical scavenging . . . ).

The instant invention aims at providing an alternative solution to the relatively complex polymerization system disclosed in WO 2012/123319, exhibiting the advantages of the solution of WO 2012/123319 in term of targeted release (typically allowing a release only at drill bit during drilling operations) but which is less complex.

To this end, the instant invention proposes to make use of encapsulated polyamines of the type disclosed in WO 2012/123319 but by using the released amine as a reactive instead as a polymerisation activator. This keeps all the advantages of the encapsulation described in WO 2012/123319 while eliminating the complexity due to the use of a polymerisable mixture.

More precisely, one subject matter of the instant invention is a method for sealing a subterranean environment, wherein a polyurethane encapsulated polyamine (namely a compound carrying more than two amine groups) is injected into the subterranean environment and is released in situ in the presence of a reactive species able to form a gel or a precipitate by a physical association and/or a chemical reaction with the released polyamine.

The reactive species used within the scope of the instant invention may be any compound able to interact and/or react with the polyamine and form a gel. Non limitative examples of reactive species useful according to the invention includes, inter alia:

Crosslinkable Components able to React with the Polyamine and form a Tridimensional Network:
Non limitative examples of such crosslinkers include:
Compounds, especially polymers, comprising more than 2 functional groups able to react with an amine group for forming a chemical bond, for example functional groups selected from carbonyl, aldehyde, ketone, carboxylic acid, ester or amide groups.
Especially suitable crosslinkable components are polyacrylamide, partially hydrolysed polyacrylamide and derivatives especially modified with ester functions such as t-butylacrylate or methylmethacrylate, for example copolymers of acrylamide and a small quantity of methylmethacrylate can very easily react with polyamine to produce a tridimensional network
Epoxy compounds, that also react easily with polyamine compounds Flocculable Components able to Physically Interact with the Polyamine
These flocculable components can especially be negative zeta potential particles inherently present in servicing fluids in given pH conditions such as bentonite clays, baritre, silica (in basic pH) or anionic components such as carboxy-functional polysaccharides for instance xanthan gum, carboxymethyl cellulose, carboxymethyl guar, or such as synthetic polymers bearing carboxylic acid functions applied in neutral to basic pH conditions for instance polyacrylic acid, polymethacrylic acid derivatives and crosslinked molecules such as partially hydrolysed polyacrylamide, superabsorbent, hydrophobically modified alkali swellable polymers in a fluid injected in the subterranean environment, for example present in a drilling fluid or a fracturing fluid. The flocs formed in situ when the flocculant interact with the released amine are able to plug fractures in fracturing application and to prevent lost circulation during a drilling process.

Whatever the exact nature of the reactive species, the polyurethane encapsulated polyamine used within the context of the instant invention is a sort of masked form of the polyamine, that release the polyamine when triggered by physical means such as high shear, high pressure, temperature, crushing, shearing or any combination thereof. Typically, the polyamine is released when triggered by physical means including high shear, crushing, shearing or any combination of the above. In most cases, there is no need of high pressure or high temperature, and therefore, according to a first embodiment, the release of the polyamine is obtained at low temperature or pressure. According to another embodiment, the release may of course be obtained with higher temperature and pressure, even if they are not necessary.

The polyamine carries more than 2 amine groups. The expression "more than 2 amine groups" herein designate: either a unique compound carrying at least 3 amine groups; or a population of different compounds (a population of polymer typically) carrying a variable number of amine groups, with a mean number of more than 2 (preferably of more than 2.5 in that case, and even more preferably of at least 3).

When the Reactive Species is a Crosslinkable Component as Defined Above:
the amine groups carried by the polyamine are preferably primary or secondary amine groups, and more preferably primary amine groups —$NH_2$. Preferably, the polyamine used according to the invention then comprises more than 2, preferably at least 3, primary or secondary amine groups. More advantageously, the polyamine used according to the invention comprises more than 2, preferably at least 3, primary amine groups —$NH_2$.
According to a specific variant, the polyamine according to the invention may be a an amino compound like an alkyldiamine, polyalkylen amine or poly alkylen imine whose alkyl or alkylen part comprises 2-4 carbon atoms. Alternatively, primary or secondary amines or amine hydrochlorides can be employed.
Hence, interesting polyamine according to the invention include tetraethylenepentamine, hexaethylenediamine, Bis(hexamethylene) triamine polyvinylamine and copolymers, polyethyleneimine, 4,4'-Oxydianiline, 3,3'-Diaminobenzidine.
According to a preferred embodiment, the compound C' includes (and more preferably consists in) a polyethyleneimine (PEI) or a mixture of polyethyleneimine. An especially suitable polyethyleneimine is commercially available from the firm BASF under the name of Lupasol®.

When the Reactive Species is a Flocculable Component as Defined Above:
In that case, the polyamine preferably comprise polyamines P carrying tertiary or quaternary amine groups. Preferably, these polyamines P then comprises more than 2, preferably at least 3, tertiary or quaternary amine groups. More advantageously, the polyamines P used according to the invention comprises more than 2, preferably at least 3, quaternary amine groups. Polyamine P are preferably used together with other polyamines carrying primary amine groups.
the polyamine P is preferably an amino compound like an alkylamine, polyalkylen amine or poly alkylen imine preferably comprising tertiary amino groups and whose alkyl or alkylen part comprises 2-4 carbon atoms.
Among the preferred polyamines P there may be mentioned diethylaminopropionitrile, triethanolamine, dimethylaminoacetonitrile, diethylenetriamine, N,N-dimethylaniline, dimethylaminoethyl methacrylate, dimethylaminoethyl acrylate, triethanolamine methacrylate and triethanolamine acrylate. PolyDADMAC, polyAPTAC, polyMAPTAC (and copolymers with acrylamide) are also suitable polyamide P.

Whatever its exact nature, the polyurethane encapsulated polyamine used within the context of the instant invention is preferably obtained by a process comprising the steps of:
(E1) providing a reverse emulsion containing:
an oil phase (herein referred as "phase (O)") comprising (for example consisting in) a curable mixture of isocyanate; and
polyalkyldiene hydroxylated or polyol
dispersed in said oil phase, drops of a water solution or dispersion (herein referred as "phase $W^1$") containing the polyamine
(E2) pouring the reverse emulsion of step (E1) in a second water phase (herein referred as $W^2$) to make a multiple emulsion water/oil/water, containing, as the internal water phase, drops including the non-amine hydrophilic compound and, then,
(E3) curing into polyurethane all or part of the heat curable mixture contained in the oil phase of the multiple emulsion obtained in step (E2), either at high temperature (typically between 50 and 95° C.) or, advantageously, at lower temperature (for instance between 15 and 30° C., e.g. at room temperature)

The process for the encapsulation of the compound C according to the invention may be carried out in batch, semi-batch or continuous. Preferably, the process is carried out in continuous.

When the encapsulated polyamine is obtained according to this process, it is advantageous that the polyamine is a compound carrying more than 2 primary amine groups or a mixture of polyamine including at least one polyamine carrying more than 2 primary amine groups.

Whatever its nature, the polyamine is preferably introduced in the phase ($W^1$) at a content of at least 5% by weight, more preferably at least 10% by weight, based on the total weight of the phase $W^1$.

Optionally, in step (E1), a non-ionic surfactant may be added to the water phase $W^1$, wherein said activator is dispersed or in solution. The non-ionic surfactant can be for example a di-$C_1$-$C_8$ alkyl ester of a saturated or unsaturated fatty acid having 12 to 22 carbon atoms.

A great number of oil phases may be used as oil phase (O) used according to the invention.

Preferably, the oil phase (O) has a viscosity lower than the viscosity of phase ($W^1$) in the conditions of steps (E1) and (E2).

According to a specific embodiment, the oil phase (O) consists in the curable mixture of isocyanate and a polyalkyldiene hydroxylated or polyol.

Alternatively, the oil phase (O) may optionally contain one or more additives selected e.g from a solvent and a plasticizer can be added to the oil phase. Possible solvents or plasticizers includes, but are not limited to, di-isobutyl ester of succinate, glutarate or adipate, petroleum distillates, natural oils, fatty acids esters. The addition of solvent or plasticizer especially allows to tune the mechanical properties of the polyurethane shells.

Optionally, in step (E1), a solvent or plasticizer can be added to the oil phase. This solvent or plasticizer may for example be di-isobutyl ester of succinate, glutarate or adipate The addition of solvent or plasticizer allows to tune the mechanical properties of the polyurethane shells.

Suitable isocyanates for the heat curable mixture present in phase (O) are alpha, omega-aliphatic diisocyanates.

These aliphatic diisocyanates, to be condensed with polyalkyldiene hydroxylated or polyol, are either isocyanate molecules, referred to as monomers, that is to say non poly-condensed, or heavier molecules resulting from one or more oligocondensation(s), or mixtures of the oligocondensates, optionally with monomer.

The commonest oligocondensates are biuret, the dimer and the trimer (in the field under consideration, the term "trimer" is used to describe the mixtures resulting from the formation of isocyanuric rings from three isocyanate functional groups; in fact, there are, in addition to the trimer, heavier products are produced during the trimerization reaction).

Mention may in particular be made, as monomer, of polymethylene diisocyanates, for example, TMDI (TetraMethylene DIsocyanate) and HDI (Hexamethylene DIsocyanate of the formula: OCN—(CH$_2$)$_6$—NCO and its isomers (methylpentamethylene diisocyanate)].

It is desirable, in the structure of the or of one of the isocyanate monomer(s), for the part of the backbone connecting two isocyanate functional groups to comprise at least one polymethylene sequence. Mention may also be made of the compounds resulting from the condensation with diols and triols (carbamates and allophanates) under substoichiometric conditions. Thus, in the isocyanate compositions, it is possible to find:

isocyanurate functional groups, which can be obtained by catalyzed cyclocondensation of isocyanate functional groups with themselves, urea functional groups, which can be obtained by reaction of isocyanate functional groups with water or primary or secondary amines, biuret functional groups, which can be obtained by condensation of isocyanate functional groups with themselves in the presence of water and of a catalyst or by reaction of isocyanate functional groups with primary or secondary amines, urethane functional groups, which can be obtained by reaction of isocyanate functional groups with hydroxyl functional groups.

The polyalkyldiene hydroxylated or polyol present in the heat curable mixture may be any compound carrying at least 2-OH groups and that is fully solubilized in the phase (O). It may be for example a polyester, acrylate, polyurethane prepolymer or modified polybutadiene. Preferably, it comprises (and preferably consists in) an hydroxylated polybutadiene.

Preferably, the water phase $W^2$ of step (E2) contains a mineral salt, for example NaCl and xanthan gum or another similar polymer. The mineral salt is used in order to balance the osmotic pressure to prevent the reverse emulsion of step (E1) from bursting. Xanthan gum is used as protective colloid and rheological agent. Any other similar polymer may be used, including, e.g., gelatin, pectin, derivative of cellulose, Arabic gum, guar gum, locust bean gum, tara gum, cassia gum, agar, modified starch such as n-octenyl starch or porous starch, alginates, carraghenanes, chitosan, scleroglucan, diutan polyvinyl alcohol, polyvinyl pyrrolidone and mixtures thereof.

The specific features of a formulation as obtained after the heating of step (E3) depend on the exact nature of the different compounds implemented in their preparation.

Generally speaking, the obtained formulation includes particles of polyurethane having typically an average diameter of between 10 and 1500 µm, preferably between 300 and 800 µm, with drops including compound C dispersed therein.

The invention will now be further illustrated by the following illustrative examples.

EXAMPLE 1

Encapsulation of a Polyethyleneimine (PEI)
Preparation of a Reverse Emulsion 151.1 g of an aqueous medium w1 containing 50% by weight of polyethyleneimine in water (Lupasol P from BASF) was dispersed within an oil phase a follows:

The aqueous medium was dispersed within an oil phase as follows:

A mixture m1 was prepared, containing 500 g of a hydroxylated (OH functionalized) butadiene of molecular weight 2000 g/mol and an average 2.6 hydroxyl function per chain. and 500 g of a rapeseed oil methyl ester with an acid index below 0.2 mg KOH/g. 151.1 g of the aqueous medium w1 were mixed with 107.8 g of the mixture m1 to form an emulsion, and then 19.43 g of isophorone di-isocyanate trimer supplied diluted with 30% wt butyl acetate (Tolonate IDT 70B from Perstorp). was added to the formed emulsion. The particle size of the emulsion (around 100-200 µm) is set by acting on the agitation speed. The mixing time after the addition of isocyanate is set to 5 mn.

Preparation of a Multiple Emulsion

An aqueous phase w2 was prepared by mixing 111 g of NaCl and 5.05 g of xanthan gum (Rhodopol 23P available from the firm Solvay, dispersed under strong agitation during 1 hour) in 883.3 g of water.

Another aqueous phase w3 was prepared by mixing 13.86 g of $Na_2CO_3$ and 5.68 g of xanthan gum (Rhodopol 23P available from the firm Solvay, dispersed under strong agitation during 1 hour) in 994.2 g of water.

278.3 g of the reverse emulsion as freshly obtained according to the previous step was poured slowly into 330.3 g of the phase w2 under agitation (3 blades paddle) and then 260.3 g of phase w" were added, whereby is obtained a multiple emulsion with a PEI concentration of 8.7% by weight based on the weight of the multiple emulsion.

Formation of the Polyurethane Shells

The obtained multiple emulsion was allowed to cure at room temperature (20° C.).

EXAMPLE 2

Formation of a Gel from the Formulation of Example 1

20 g of the formulation prepared in example 1, containing polyethyleneimine encapsulated in polyurethane shells, was mixed with 200 g of an aqueous solution comprising 5% by weight of polyacrylamide-methyl methacrylate copolymer 90-10% mol (molecular weight 100 kg/mol) in tap water.

A solution of very low viscosity, easily pumpable, is obtained (80 mPa·s at 1 $s^{-1}$) and the solution remains of low viscosity at low and moderate shear after 2 hrs at 60° C. When applying a high shear using a Silverson 4LRT rotor stator blender equipped with a 2 mm square hole high shear screen workhead at 7000 rpm, a gelation is triggered (due to the liberation of the PEI which reacts with the derivative polyacrylamide), and a high viscosity is obtained after 2 hrs at 60° C. (80000 mPa·s at 1 $s^{-1}$).

Gel setting is monitored using AR-G2 rheometer (from TA instruments) equipped with modified Couette cell helicoidal geometry.

The invention claimed is:

1. A method for sealing a subterranean environment, wherein a polyurethane encapsulated polyamine is injected into the subterranean environment, and is released in situ in the presence of a reactive species able to form a gel or a precipitate by a physical association and/or a chemical reaction with the released polyamine; wherein the reactive species is a crosslinkable component able to react with the polyamine and form a tridimensional network.

2. The method of claim 1, wherein the reactive species comprises more than 2 functional groups able to react with an amine group for forming a chemical bond.

3. The method of claim 2, wherein the reactive species is selected from the group consisting of polyacrylamide, a partially hydrolysed polyacrylamide, and derivatives thereof.

4. The method of claim 3, wherein the reactive species is modified with ester functions.

5. The method of claim 4, wherein the reactive species is modified with t-butylacrylate or methylmethacrylate.

6. The method of claim 2, wherein the more than 2 functional groups are selected from the group consisting of carbonyl, aldehyde, ketone, carboxylic acid, ester and amide groups.

7. The method of claim 1, wherein the reactive species is an epoxy compound.

8. The method of claim 1, wherein the amine groups carried by the polyamine are primary or secondary amine groups.

9. The method of claim 1, wherein the polyurethane encapsulated polyamine is obtained by a process comprising the steps of:
  (E1) providing a reverse emulsion containing:
    an oil phase comprising a curable mixture of
      isocyanate; and
      polyalkyldiene hydroxylated or polyol
    dispersed in said oil phase, drops of a water solution or dispersion containing the polyamine,
  (E2) pouring the reverse emulsion of step (E1) in a second water phase to make a multiple emulsion water/oil/water, containing, as the internal water phase, drops including the non-amine hydrophilic compound and, then,
  (E3) curing into polyurethane all or part of the heat curable mixture contained in the oil phase of the multiple emulsion obtained in step (E2), either at high temperature or at lower temperature.

10. The method of claim 9, wherein step (E3) is conducted between 50 and 95° C.

11. The method of claim 9, wherein step (E3) is conducted between 15 and 30° C.

12. The method of claim 9, wherein step (E3) is conducted at room temperature.

* * * * *